(12) United States Patent
Berdowski et al.

(10) Patent No.: US 11,719,115 B2
(45) Date of Patent: Aug. 8, 2023

(54) CLEARANCE CONTROL STRUCTURE FOR A GAS TURBINE ENGINE

(71) Applicants: General Electric Company, Schenectady, NY (US); General Electric Deutschland Holding GmbH, Frankfurt (DE); General Electric Company Polska Sp. z o.o., Warsaw (PL)

(72) Inventors: Tomasz Edward Berdowski, Warsaw (PL); Ashish Sharma, Munich (DE); Raymond Floyd Martell, Wyoming, OH (US); Piotr Jerzy Kulinski, Warsaw (PL); Lukasz Maciej Janczak, Warsaw (PL)

(73) Assignees: GENERAL ELECTRIC COMPANY, Schenectady, NY (US); GENERAL ELECTRIC DEUTSCHLAND HOLDING GMBH, Frankfurt (DE); GENERAL ELECTRIC COMPANY POLSKA SP. Z O.O, Warsaw (PL)

( * ) Notice: Subject to any disclaimer, the term of this patent is extended or adjusted under 35 U.S.C. 154(b) by 68 days.

(21) Appl. No.: 17/561,182

(22) Filed: Dec. 23, 2021

(65) Prior Publication Data
US 2023/0147089 A1    May 11, 2023

(51) Int. Cl.
*F01D 25/26* (2006.01)
*F01D 11/18* (2006.01)
(52) U.S. Cl.
CPC .............. *F01D 11/18* (2013.01); *F01D 25/26* (2013.01); *F05D 2240/11* (2013.01); *F05D 2260/38* (2013.01)

(58) Field of Classification Search
None
See application file for complete search history.

(56) References Cited

U.S. PATENT DOCUMENTS 4,317,646 A    3/1982  Steel et al.
4,363,599 A *  12/1982 Cline ........................ F01D 1/34
                                                    415/173.2

(Continued)

FOREIGN PATENT DOCUMENTS

CN         109229337 A       1/2019

*Primary Examiner* — Michael Lebentritt
(74) *Attorney, Agent, or Firm* — Dority & Manning, P.A.

(57) ABSTRACT

A gas turbine engine including a first turbine rotor assembly having a plurality of first turbine rotor blades extended within a gas flowpath, and a second turbine rotor assembly positioned aft along the gas flowpath of the first turbine rotor assembly. The second turbine rotor assembly is rotatably separate from the first turbine rotor assembly. A casing surrounds the first turbine rotor assembly. The casing has a unitary, integral outer casing wall extended forward of the first turbine rotor assembly and aft of the first turbine rotor assembly. The casing includes a plurality of vanes extended from the outer casing wall and through the gas flowpath aft of the first turbine rotor assembly and forward of the second turbine rotor assembly. The casing includes a plurality of walls forming thermal control rings extended outward along the radial direction from the outer casing wall. The outer casing wall and the thermal control rings is a unitary, integral structure.

20 Claims, 9 Drawing Sheets

(56) References Cited

U.S. PATENT DOCUMENTS

| | | | |
|---|---|---|---|
| 5,116,199 A * | 5/1992 | Ciokajlo | F01D 11/24 |
| | | | 415/173.2 |
| 5,123,242 A | 6/1992 | Miller | |
| 5,127,795 A * | 7/1992 | Plemmons | F01D 11/18 |
| | | | 415/177 |
| 7,597,537 B2 | 10/2009 | Bucaro et al. | |
| 7,837,429 B2 | 11/2010 | Zhang et al. | |
| 8,652,602 B1 | 2/2014 | Dolla | |
| 9,097,134 B2 | 8/2015 | Ferch et al. | |
| 9,151,226 B2 | 10/2015 | Zimmermann et al. | |
| 9,435,224 B2 | 9/2016 | Raison et al. | |
| 9,534,505 B2 | 1/2017 | Lucas | |
| 10,443,445 B2 | 10/2019 | Liebl et al. | |
| 10,533,747 B2 | 1/2020 | Corsmeier et al. | |
| 10,583,933 B2 | 3/2020 | Elbibary et al. | |
| 10,914,187 B2 | 2/2021 | Eastwood et al. | |
| 2007/0003410 A1 * | 1/2007 | Chehab | F01D 11/04 |
| | | | 415/173.1 |
| 2010/0209231 A1 * | 8/2010 | Lewis | F04D 29/563 |
| | | | 415/127 |
| 2013/0170966 A1 | 7/2013 | Cook | |
| 2014/0341707 A1 * | 11/2014 | Jones | F01D 9/04 |
| | | | 415/1 |
| 2016/0169027 A1 * | 6/2016 | Jones | F01D 25/12 |
| | | | 415/116 |
| 2016/0377091 A1 | 12/2016 | Cortequisse | |
| 2017/0114667 A1 | 4/2017 | Sabo et al. | |
| 2018/0038654 A1 | 2/2018 | Popp et al. | |
| 2018/0156056 A1 * | 6/2018 | Bonacum | F01D 25/26 |
| 2018/0245471 A1 | 8/2018 | Eriksson et al. | |
| 2018/0347468 A1 | 12/2018 | Caimano et al. | |
| 2019/0136708 A1 * | 5/2019 | Sebastian | F01D 25/243 |
| 2019/0271237 A1 | 9/2019 | Martin et al. | |
| 2019/0379257 A1 | 12/2019 | Gerstler et al. | |
| 2020/0003157 A1 * | 1/2020 | Clements | F01D 5/225 |
| 2020/0025304 A1 | 1/2020 | Minta et al. | |
| 2020/0141654 A1 | 5/2020 | Ranjan | |
| 2020/0300115 A1 | 9/2020 | Aurahs et al. | |
| 2021/0001990 A1 | 1/2021 | Garcia Zuazo et al. | |

* cited by examiner

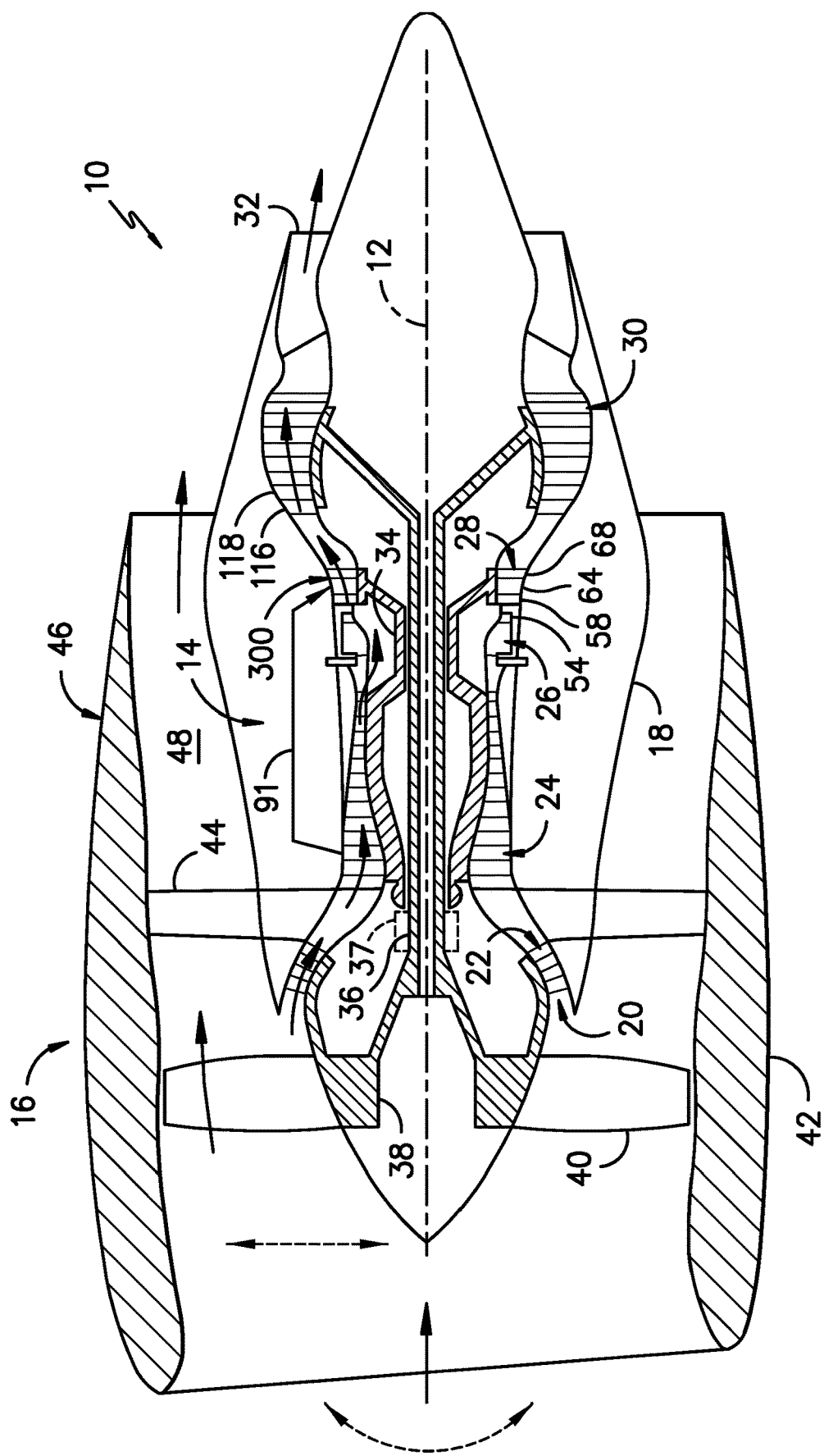
FIG. -1-

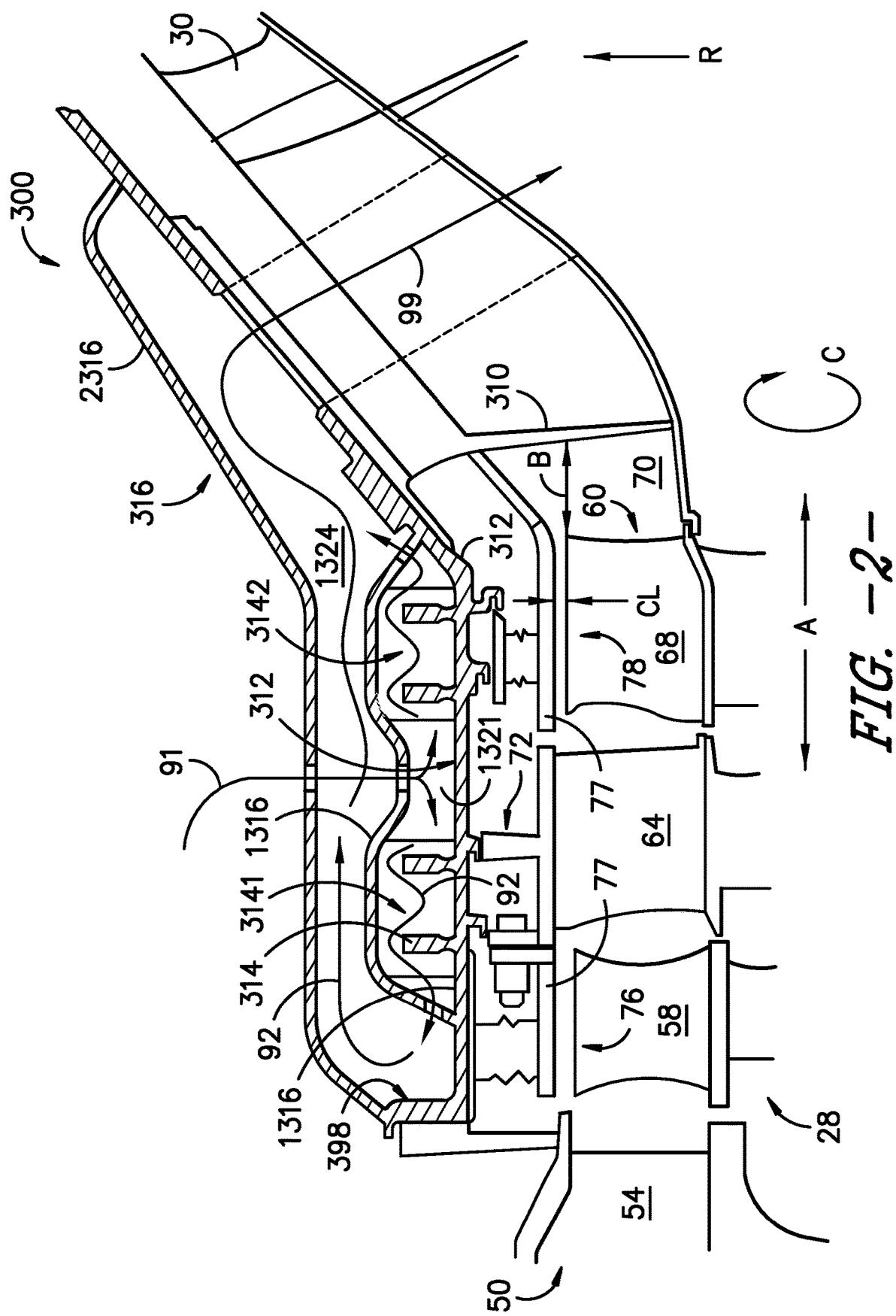
FIG. -2-

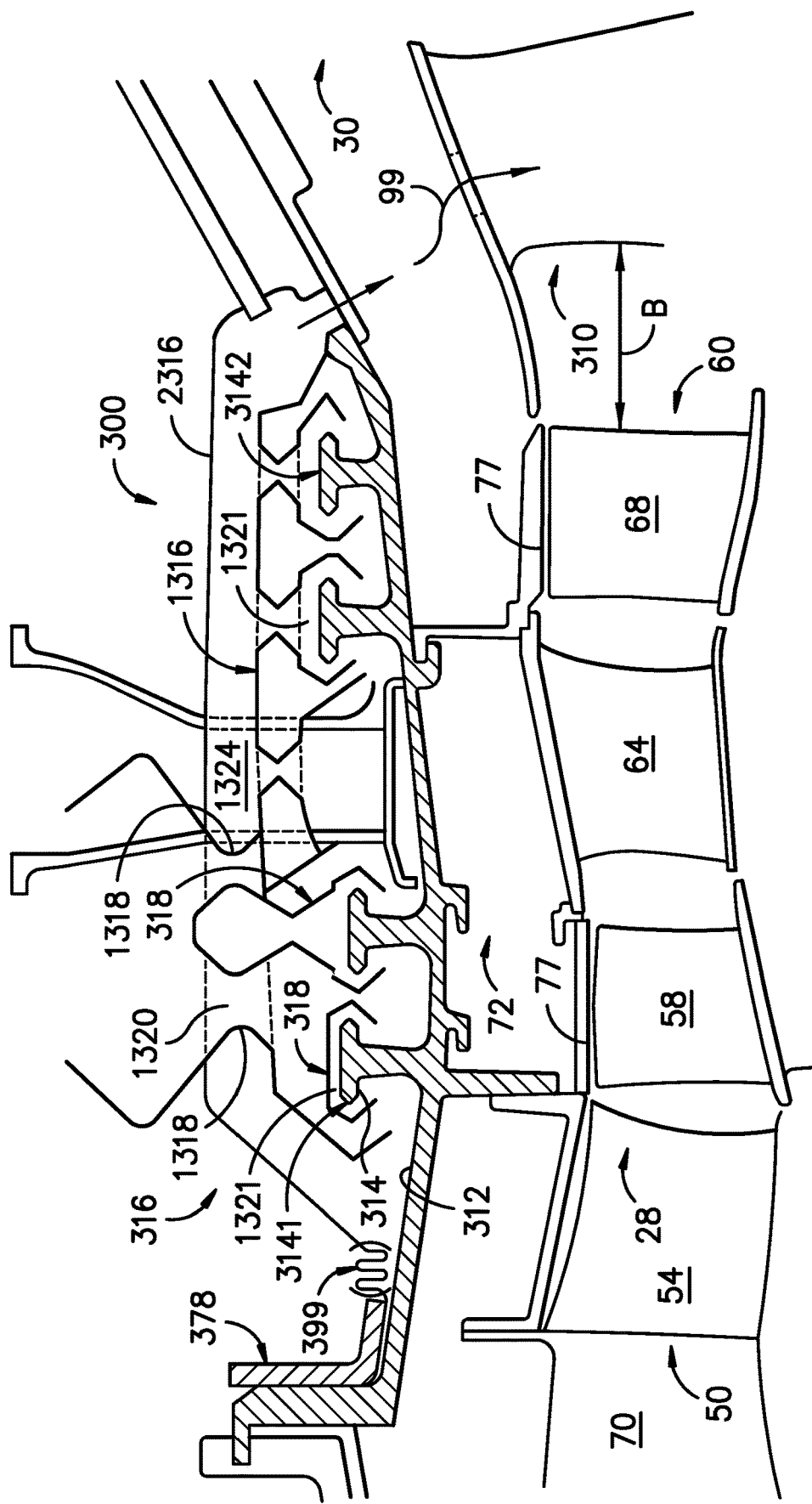
FIG. -3-

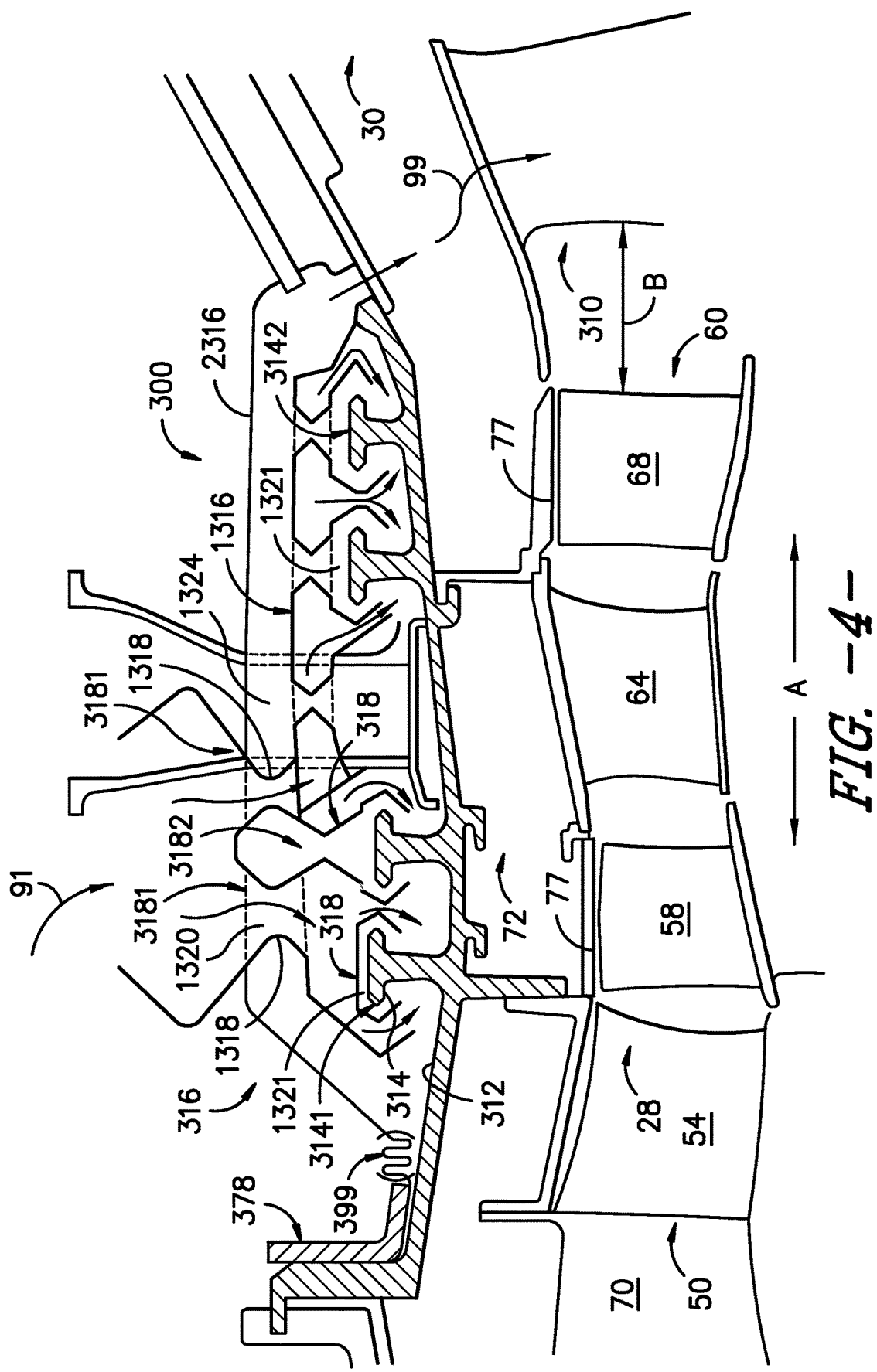
FIG. -4-

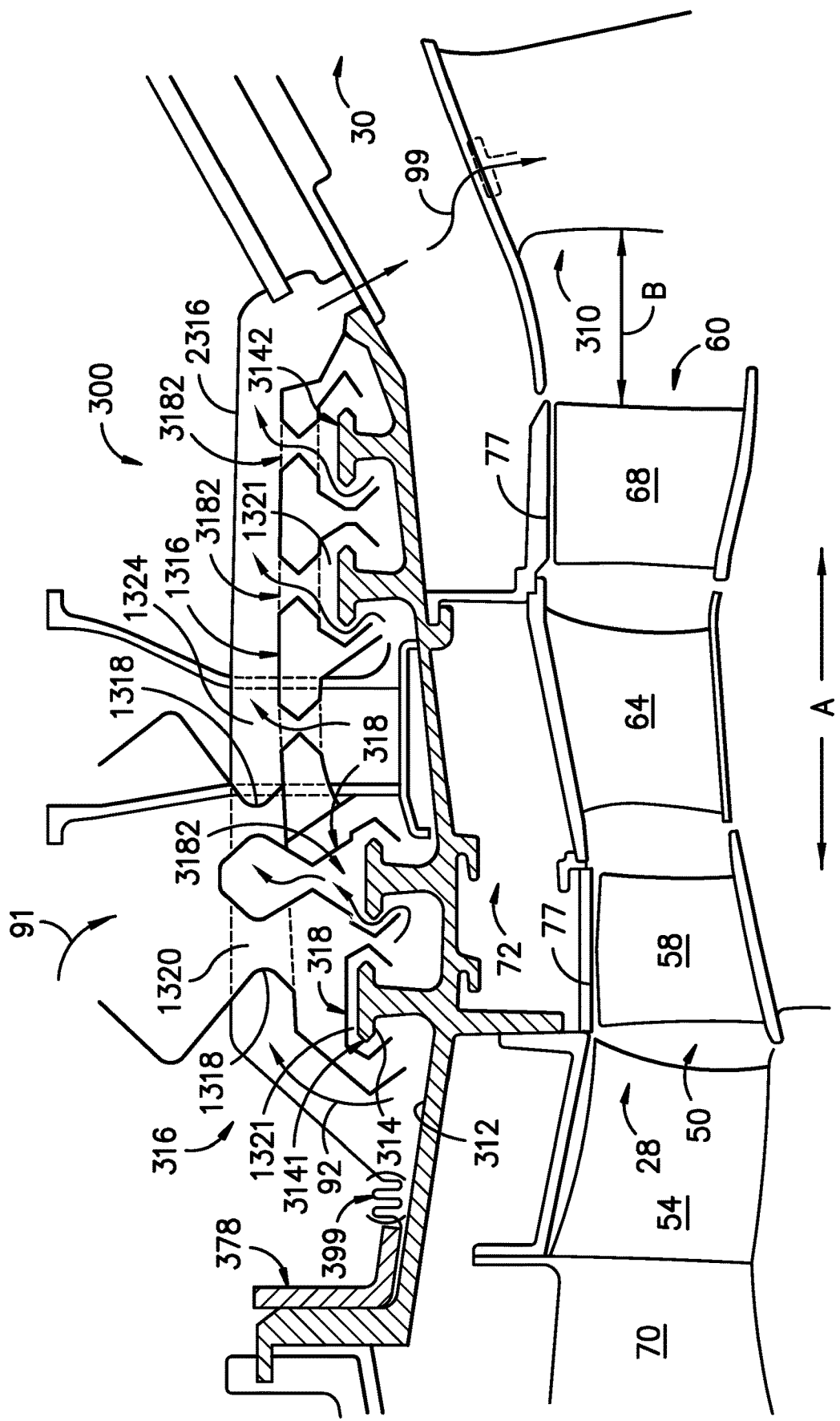

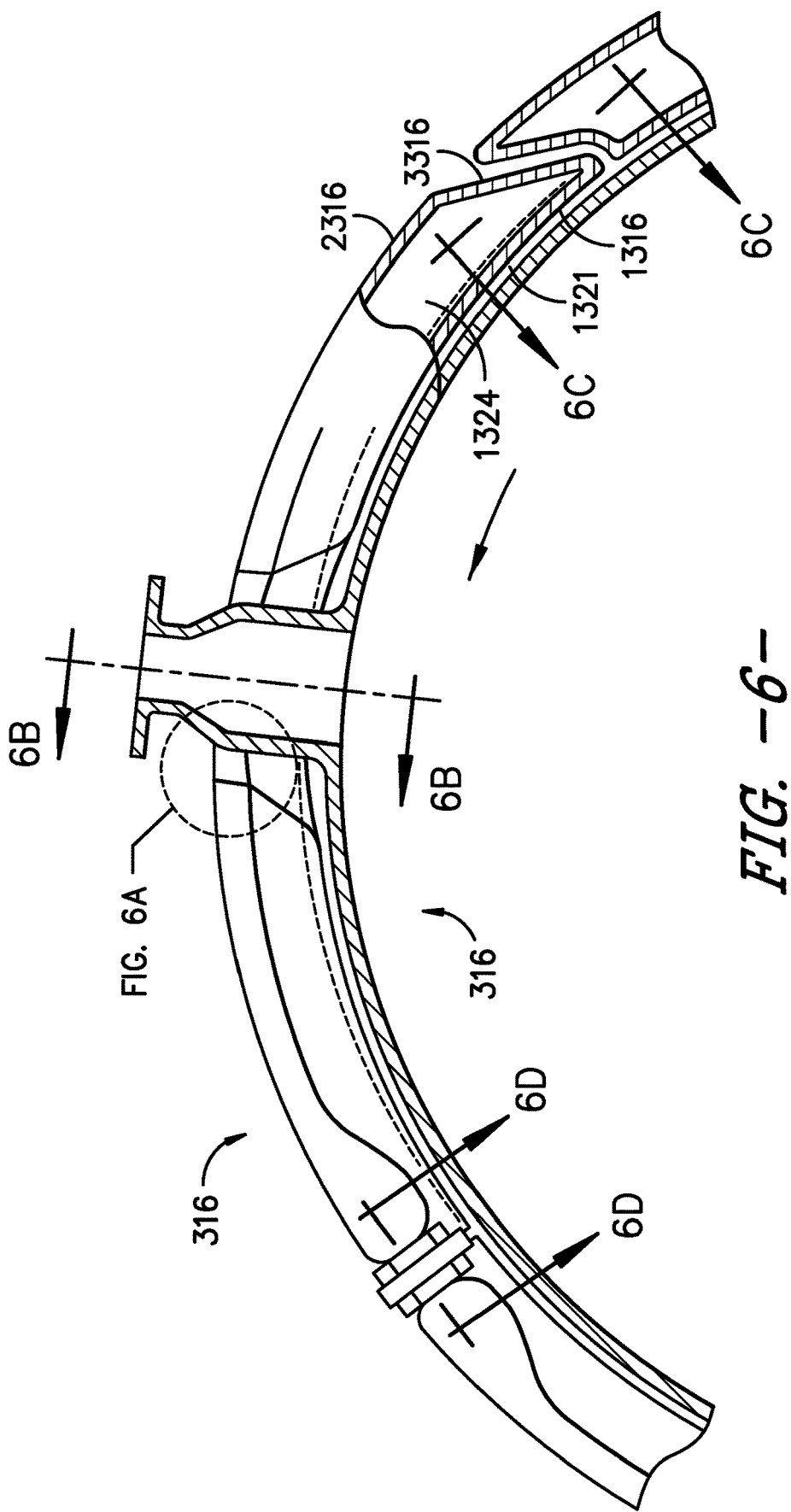
FIG. -6-

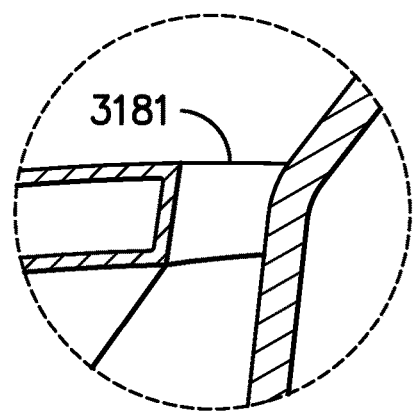
FIG. -6A-
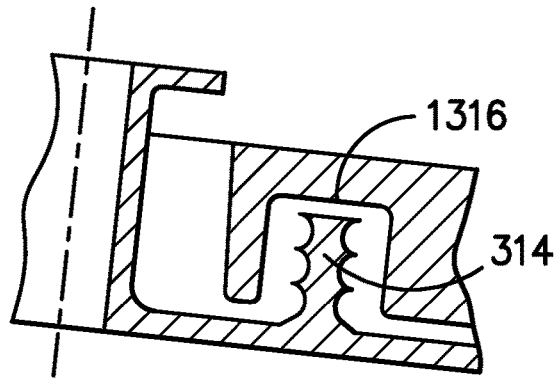
FIG. -6B-
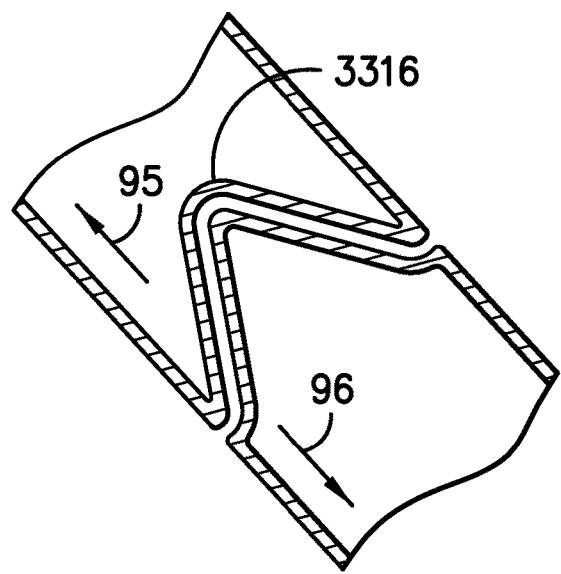
FIG. -6C-
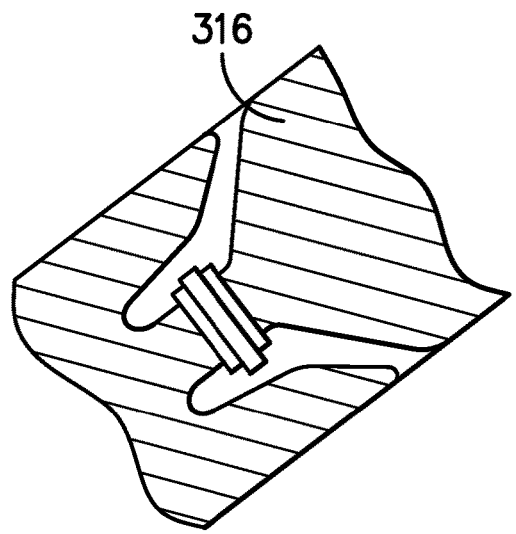
FIG. -6D-

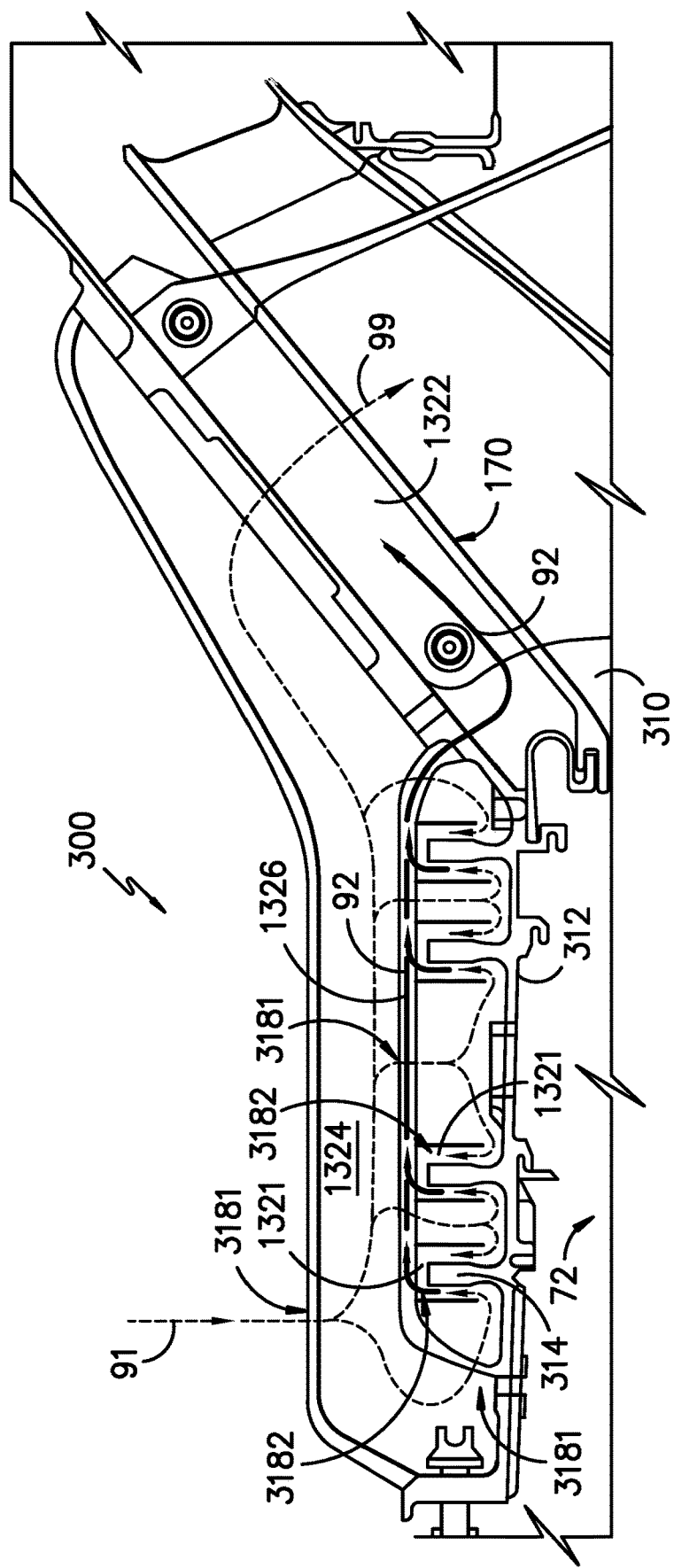
FIG. -7-

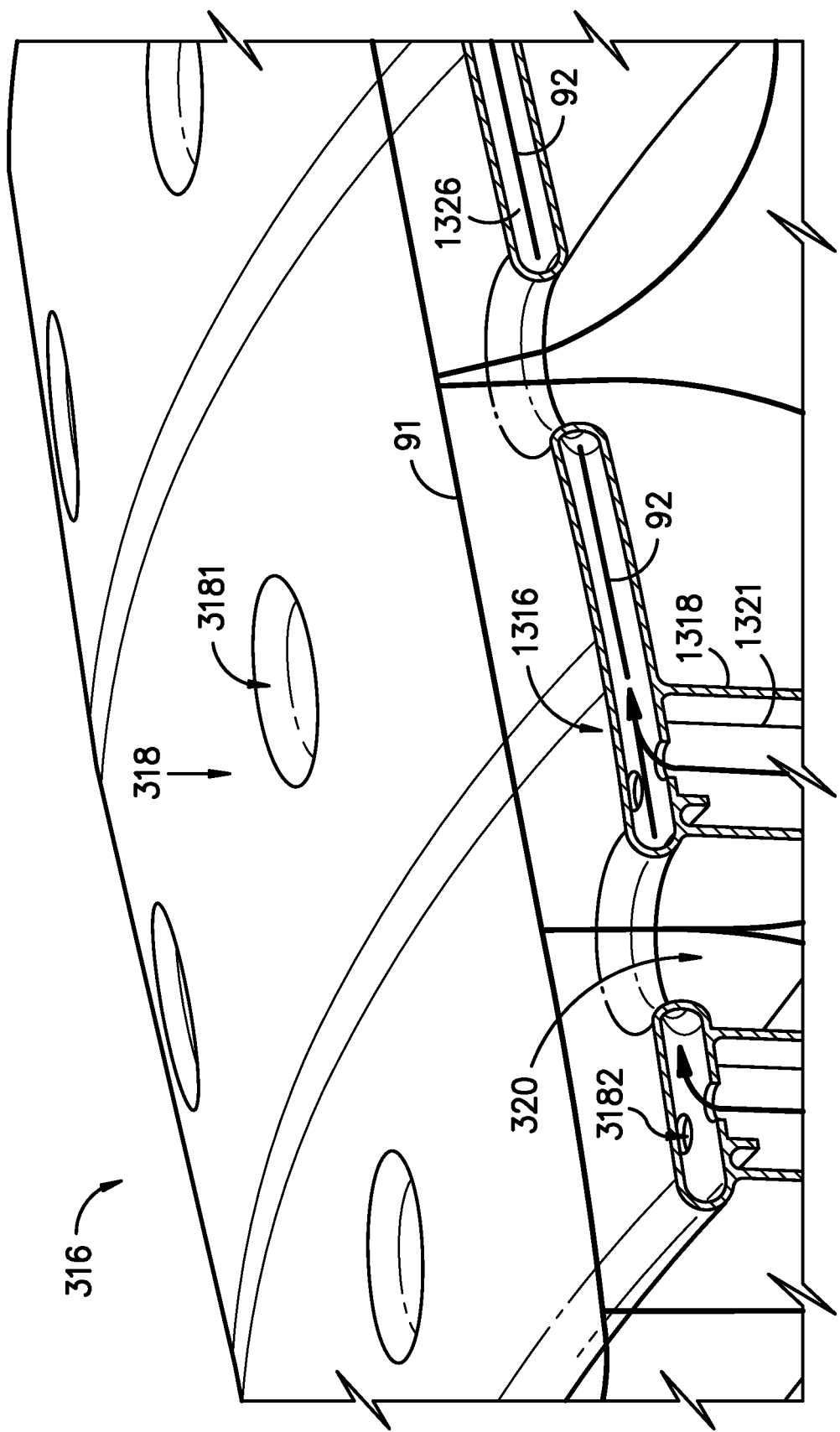
FIG. -8-

US 11,719,115 B2

CLEARANCE CONTROL STRUCTURE FOR A GAS TURBINE ENGINE

GOVERNMENT SPONSORED RESEARCH

The project leading to this application has received funding from the European Union Clean Sky 2 research and innovation program under grant agreement No. CS2-ENG-GAM-2014-2015-01.

CROSS-REFERENCE TO RELATED APPLICATIONS

This application claims priority to Polish Patent Application No. P.439447, filed Nov. 5, 2021, which is a non-provisional application, and wherein the above application is hereby incorporated by reference in its entirety.

FIELD

The present subject matter relates generally to clearance control structures for gas turbine engines. The present subject matter relates particularly to clearance control structures for turbine sections of gas turbine engines.

BACKGROUND

Casings for gas turbine engines, such as turbine section casings surrounding turbine section rotors, generally require separable flanges and assembled casing and manifold portions due to internally and externally mounted components. Such components generally include brackets or hangers for turbine shrouds, or flanges for multiple casings. Additionally, since turbine casings surround turbine rotors, excessive deformation, thermal expansion or contraction, or bowing may result in excessive rub and undesired contact with the turbine rotors, which can result in loss in performance or operability. Conventional casings may include assemblies via separable flanges to limit deformation or displacement during engine operation and thermal cycling. However, the inventors of the present disclosure have found that such designs require assembly and parts that add weight to the engine. Moreover, the inventors of the present disclosure have found that such designs may further inhibit the inclusion or placement of thermal control structures for more effective clearance control.

As such, the inventors of the present disclosure have found that there is a need for turbine casings that can overcome these limitations and provide improved thermal control, improved engine efficiency, and reduced weight.

BRIEF DESCRIPTION

Aspects and advantages of the invention will be set forth in part in the following description, or may be obvious from the description, or may be learned through practice of the invention.

An aspect of the disclosure is directed to a gas turbine engine having a first turbine rotor assembly including a plurality of first turbine rotor blades extended within a gas flowpath. A second turbine rotor assembly is positioned aft along the gas flowpath of the first turbine rotor assembly. The second turbine rotor assembly is rotatably separate from the first turbine rotor assembly. A casing surrounds the first turbine rotor assembly. The casing includes an outer casing wall extended forward of the first turbine rotor assembly and aft of the first turbine rotor assembly. The casing includes a plurality of vanes extended from the outer casing wall and through the gas flowpath aft of the first turbine rotor assembly and forward of the second turbine rotor assembly. The casing includes a plurality of walls forming thermal control rings extended outward along the radial direction from the outer casing wall. The outer casing wall and the thermal control rings is a unitary, integral structure.

Another aspect of the present disclosure is directed to a gas turbine engine having the first turbine rotor assembly, the second turbine rotor assembly, and the casing. An inner manifold wall surrounds the plurality of walls at the casing along the circumferential direction and the axial direction. The inner manifold wall is extended forward along the axial direction of the plurality of vanes, and the inner manifold wall is connected to the outer casing wall forward of the plurality of vanes. An outer manifold wall surrounds the inner manifold wall. In certain embodiments, the inner manifold wall and the outer manifold wall together form a unitary, integral structure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exemplary schematic cross sectional view of a turbomachine engine including a turbine section and casing in accordance with aspects of the present disclosure;

FIGS. 2-5 are exemplary schematic cross sectional view of embodiments of a portion of a turbine section and casing in accordance with aspects of the present disclosure;

FIG. 6 is an exemplary perspective view of an embodiment of a portion of a manifold of the turbine section in accordance with aspects of the present disclosure;

FIGS. 6A-6D are exemplary sectional views of an embodiment of the manifold provided in FIG. 6;

FIG. 7 is an exemplary schematic cross sectional view of an embodiment of a portion of a turbine section and casing in accordance with aspects of the present disclosure; and FIG. 8 is an exemplary perspective view of an embodiment of a portion of a manifold of the turbine section in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

One or more components of the turbomachine engine described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Suitable powder materials for the manufacture of the structures provided herein as integral, unitary, structures include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

An improved turbine casing is provided allowing for improved clearance control, cooling fluid distribution, reduced weight, and improved engine efficiency. Embodiments of an engine, casing, and manifold provided herein include integral, unitary structures such as may be formed by additive manufacturing processes that would not have heretofore been possible or practicable. Embodiments depicted and described herein allow for improved and advantageous positioning of thermal control rings for improved clearance control response, improved formation and positioning of openings, passages, and conduits to allow for more efficient heat transfer fluid utilization and movement, and reduced weight, such as via obviating flanges and sub-assemblies into integral components. Particular combinations of these features allow for improved heat transfer properties and reduced thermal gradients. Improved heat transfer properties particularly include a lower heat transfer coefficient at certain features, such as at the plurality of walls that form thermal control rings as provided herein. Such improvements may mitigate or eliminate undesired or excessive deformation, ovalization, bowing, or other changes in casing geometry that may adversely affect deflections or result in undesired contact to the turbine rotors.

Embodiments provided herein include, e.g., an integral, unitary high pressure turbine casing and turbine center frame or mid-turbine frame positioned downstream of the high pressure turbine and upstream of a low- or intermediate-pressure turbine. Embodiments provided herein further include, e.g., an integral, unitary clearance control manifold configured to provide heat transfer fluid to thermal control rings. The integral, unitary structures may further allow for improved positioning of the thermal control rings relative to the turbine rotors, such as to provide improved clearance control across the turbine rotor assembly.

As used herein, the term "integral, unitary" as used to describe a structure refers to the structure being formed integrally of a continuous material or group of materials with no seams, connections joints, or the like. The integra, unitary structures described herein may be formed through additive manufacturing to have the described structure, or alternatively through a casting process, etc.

Referring now to the drawings, FIG. 1 is a schematic cross-sectional view of an exemplary gas turbine engine 10 herein referred to as "engine 10" as may incorporate various embodiments of the present disclosure. Particular embodiments of the engine 10 may be configured as a turbofan, turboprop, turboshaft, or propfan gas turbine engine, or one or more gas turbine engines configured as propulsion systems, auxiliary power units (APU), industrial gas turbines, hybrid-electric gas turbines, or other gas turbine engine configuration.

As shown in FIG. 1, the engine 10 has a longitudinal or axial centerline axis 12 that extends therethrough for reference purposes. In general, the engine 10 may include a core engine 14 disposed downstream from a fan section 16.

The core engine 14 may generally include a substantially tubular outer casing 18 that defines an annular inlet 20. The outer casing 18 may be formed from multiple casings. The outer casing 18 encases, in serial flow relationship, a compressor section having a booster or low speed compressor 22, a high speed compressor 24, a combustion section 26, a turbine section including a high speed turbine 28, a low speed turbine 30 (e.g., including vanes 116 and rotor blades 118), and a jet exhaust nozzle section 32. A high speed shaft or spool 34 drivingly connects the high speed turbine 28 to the high speed compressor 24. A low speed shaft or spool 36 drivingly connects the low speed turbine 30 to the low speed compressor 22. The low spool 36 may also be connected to a fan spool or shaft 38 of the fan section 16. In particular embodiments, the low spool 36 may be connected directly to the fan spool 38 such as in a direct-drive configuration. In alternative configurations, the low spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed compressor within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

Although depicted and described as a two-spool engine including the high speed spool separately rotatable from the low speed spool, it should be appreciated that the engine 10 may be configured as a three-spool engine including the high speed spool, the low speed spool, and an intermediate speed spool positioned in serial flow arrangement between the high speed spool and the low speed spool. It should further be appreciated that the low speed turbine or second turbine rotor assembly described herein generally refers to a separately rotatable spool downstream of the high speed turbine or first turbine rotor assembly. As such, the second turbine rotor assembly may include an intermediate speed turbine or a low speed turbine positioned aft or downstream of the high speed turbine.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the core engine 14. It should be appreciated by those of ordinary skill in the art that the nacelle 42 may be configured to be supported relative to the core engine 14 by a plurality of circumferentially-spaced outlet guide vanes 44. Moreover, a downstream section 46 of the nacelle 42 (downstream of the guide vanes 44) may extend over an outer portion of the core engine 14 so as to define a bypass airflow passage 48 therebetween. It should further be appreciated by those of ordinary skill in the art that certain embodiments of the engine may omit the nacelle 42, such as to form a propfan or open rotor engine. Additionally, it should be appreciated by those of ordinary skill in the art that embodiments of the core engine 14 provided herein may be applied to other gas turbine engine configurations such as provided herein.

FIG. 2 provides an enlarged cross sectioned view of the turbine section portion of the core engine 14 as shown in FIG. 1, as may incorporate various embodiments of the present disclosure. As shown in FIG. 2, a first turbine rotor assembly is formed by the high speed turbine 28. The first turbine rotor assembly includes a plurality of first turbine rotor blades 58 extended within the core gas flowpath 70. A first stage 50 of the first turbine rotor assembly includes an annular array of stator vanes 54 (only one shown) axially spaced from an annular array of turbine rotor blades 58 (only one shown) at the high speed turbine 28. In a particular embodiment, the high speed turbine 28 further includes a last stage 60 which includes an annular array of stator vanes 64 (only one shown) axially spaced from an annular array of turbine rotor blades 68 (only one shown). The turbine rotor blades 58, 68 extend radially outwardly from and are coupled to the HP spool 34 (FIG. 1). The stator vanes 54, 64 and the turbine rotor blades 58, 68 at least partially define a core gas flowpath 70 for routing combustion gases from the combustion section 26 (FIG. 1) through the high speed turbine 28.

As further shown in FIG. 2, the high speed turbine may include one or more shroud assemblies, each of which forms an annular ring about an annular array of rotor blades. For example, a shroud assembly 72 may form an annular ring around the annular array of rotor blades 58 of the first stage 50 and the annular array of turbine rotor blades 68 of the last stage 60. In general, the shroud assembly 72 is radially spaced from blade tips 76, 78 of each of the rotor blades 58, 68. A radial or clearance gap CL is defined between the blade tips 76, 78 and respective inner surfaces of the shroud segments 77. The shroud assembly 72 generally reduces leakage from the core gas flowpath 70. The shroud assembly 72 can include a plurality of walls forming thermal control rings 314 that assist in controlling thermal growth of the shroud thereby controlling the radial deflection or clearance gap CL. Thermal growth in the shroud assemblies is actively controlled with an active clearance control ("ACC") system (not labeled). The ACC is used to minimize radial blade tip clearance CL between the outer blade tip and the shroud, particularly during cruise operation of the engine.

Downstream along the core gas flowpath 70, or aft of the high speed turbine 28, is a second turbine rotor assembly formed by the low speed turbine 30. As previously described herein, the second turbine rotor assembly is rotatably separate from the first turbine rotor assembly, such as described in regard to the high speed turbine 28 and the low speed turbine 30 above with reference to FIG. 1.

A casing 300 surrounds the high speed turbine 28. The casing 300 includes a plurality of vanes 310 extended through the core gas flowpath 70 aft of the first turbine rotor assembly formed by the high speed turbine 28 and forward of the second turbine rotor assembly formed by the low speed turbine 30. The shroud assembly 72 is coupled to the casing 300 at an outer casing wall 312. The outer casing wall 312 is an annular wall surrounding the shroud assembly 72 and extended along a circumferential direction C relative to the centerline axis 12 (FIG. 1). The outer casing wall 312 is extended along an axial direction A forward of the rotor blades 58 of the first stage 50 of the high speed turbine 28 (also referred to as the first stage of rotor blades 58) and aft of the rotor blades 68 of the second or last stage 60 of the high speed turbine 28 (also referred to as the second stage of rotor blades 68).

The plurality of vanes 310 is extended from the outer casing wall 312. The plurality of vanes 310 is extended into the core gas flowpath 70, In certain embodiments further described herein, one or more of the vanes 310 may be hollow or include conduits or passages allowing for fluid flow within the vane. The outer casing wall 312 of the casing 300 is extended along the axial direction A from a downstream end or trailing edge of the aft-most stage of the rotor blades 68 to at least an upstream end or leading edge of the plurality of vanes 310, such as depicted at dimension B in FIG. 2.

It should be appreciated that conventional turbine casings include separable or joined flanges, such as bolted flanges or welded flanges, between a high pressure turbine casing and a downstream casing, such as an inter-turbine frame, mid-turbine frame, intermediate pressure turbine casing, or low pressure turbine casing. Embodiments of the casing 300 provided herein, include unitary, integral structures, such as formed by one or more additive manufacturing processes. Embodiments provided herein further form integral, continuous, compliant structures, allowing for the unitary, integral extension of the casing 300 such as provided herein, or further including one or more features integrally formed to the casing 300 such as provided herein.

A plurality of walls forming thermal control rings 314 is extended along the circumferential direction C and extended outward along a radial direction R from the outer casing wall 312. In various embodiments, the thermal control rings 314 include forward thermal control rings 3141 positioned outward along the radial direction R from the first stage of rotor blades 58, or particularly from the blade tips 76 of the rotor blades 58, of the high speed turbine 28. In certain embodiments, such as depicted in FIGS. 3-4, the forward thermal control rings 3141 are positioned in alignment along the axial direction A to the first stage of rotor blades 58. In another particular embodiment, the thermal control rings 314 include aft thermal control rings 3142 positioned outward along the radial direction R from the last stage 60 of rotor blades 68, or particularly from the blade tips 78 of the rotor blades 68, of the high speed turbine 28. In certain embodiments, such as depicted in FIGS. 3-4, the aft thermal control rings 3142 are positioned in alignment along the axial direction A to the last stage 60 of rotor blades 68 of the high speed turbine 28.

The forward and aft thermal control rings 3141 and 3142 are provided to more effectively control blade tip clearance CL (shown in FIG. 2) with a minimal amount of time lag and thermal control airflow (cooling or heating depending on operating conditions). The forward and aft thermal control rings 3141 and 3142 are formed with the outer casing wall 312 as an integral, singular, unitary structure of the casing 300. The thermal control rings 314 provide thermal control mass to more effectively move the shroud segments 77 along the radial direction R to adjust the blade tip clearances CL. Such clearance control provides for lower operational specific fuel consumption (SFC).

The integral, unitary structure of the thermal control rings 314 and the outer casing wall 312, with the outer casing wall particularly extended aft of the second or last stage of the rotor blades 68 of the high speed turbine 28, allow for improved clearance control, improved thermal control, and improved cooling flow. The structures provided herein allow for the thermal control rings 314 to be positioned radially outward of and in axial alignment with each stage of the high speed turbine rotor, such as to improve clearance control at each respective stage. The structures provided herein further allow for obviating flanges between the high speed turbine and an intermediate turbine frame between the high speed turbine and a downstream low speed turbine (or intermediate speed turbine, such as described herein).

Embodiments of the integral casing provided herein are generally produced by one or more additive manufacturing processes such as described above. Although additive manufacturing may generally be applied to form various structures or integrate various components, it should be appreciated that combinations of integrated structures provided herein overcome issues associated with integrating structures while providing unexpected benefits. In one instance, axially-extended casings are generally susceptible to thermal distortion that may ovalize the core flowpath, which may adversely affect rotor operation as the rotors may rub within a non-concentric flowpath. As such, simple integration of relatively hot casings surrounding the high speed turbine with the relatively cooler casing surrounding downstream vanes proximate to the low speed turbine may adversely affect overall engine operation. In another instance, such large, axially-extended masses may require additional cooling flow, which results in increased fuel consumption and overall losses in engine performance.

Embodiments of the engine provided herein overcome such issues at least in part by the positioning of the thermal control rings in axial alignment and radially outward of the respective stages of the high speed turbine blades. Removing flanges between a casing surrounding the high speed turbine rotors and a vane casing or frame downstream of the high speed turbine allows for the thermal control rings to be advantageously positioned as disclosed herein.

Other embodiments of the engine provided herein overcome such issues at least in part by improved cooling flow structures, passages, and conduits. In various embodiments, a manifold 316 surrounds the thermal control rings 314 along the circumferential direction C and the axial direction A. The manifold 316 is configured to provide a flow of fluid, such as relatively cool air from the compressor section, to the thermal control rings 314.

Referring now to the FIGS. 2-5, and FIG. 7, further exemplary embodiments are provided. The embodiment depicted in FIG. 2, FIG. 3, and FIG. 7 may be configured similarly as one another, such as further described below. FIGS. 4-5 provide views of flows of fluid and openings at various cross-sections of FIG. 3. Each of the embodiments may be formed via one or more manufacturing methods known in the art. In FIG. 7, the embodiment provided may include double-wall structures that may be formed via an additive manufacturing process. Various embodiments provided herein may be formed as integral, unitary structures, such as via an additive manufacturing process or other appropriate manufacturing process.

Referring to the various embodiments depicted in FIGS. 2-5 and FIG. 7, the manifold 316 is extended along the axial direction A forward and aft of the plurality of axially-spaced stages of the plurality of walls forming the thermal control rings 314. In a particular embodiment, such as depicted in FIG. 7, the manifold 316 is extended aft along the axial direction A of the plurality of vanes 310. In various embodiments, such as in the exemplary embodiment of FIG. 2, the manifold 316, the outer casing wall 312, and the plurality of walls forming the thermal control rings 314 of the casing 300 is a single, integral, unitary structure, such as described herein. In particular embodiments, such as in the exemplary embodiment of FIG. 2, the manifold 316 includes a plurality of concentric walls integrally formed and surrounding the outer casing wall 312. In certain embodiments, the manifold 316 includes an inner manifold wall 1316 radially inward of and concentric to an outer manifold wall 2316. In still certain embodiments, the inner manifold wall 1316 is a double wall structure concentric to the outer manifold wall 2316.

Referring particularly to FIGS. 3-5, certain embodiments of the casing 300 include a corrugated feature 399. The corrugated feature 399 includes a shape defining ridges or grooves configured to mitigate formation of thermal expansion stresses at the casing 300. In certain embodiments, the corrugated feature 399 is formed at the manifold 316. In a still particular embodiment, the corrugated feature 399 may be formed at an inner manifold wall 1316 or an outer manifold wall 2316. The corrugated feature 399 may allow for the unitary, integral formation of the manifold 316 with the outer casing wall 312, such as described in various embodiments herein.

Referring briefly to FIG. 8, and in conjunction with FIGS. 2-7, the manifold 316 includes a plurality of openings 318 surrounding the plurality of walls forming the thermal control rings 314 at the casing 300. The plurality of openings 318 allow for the flow of fluid, depicted schematically via arrows 91, to come into thermal communication with the thermal control rings 314 for desired heat transfer effect. In various embodiments, the plurality of openings 318 include an inlet opening 3181 configured to allow the flow of fluid 91 into a first cavity 1321 in thermal communication with the thermal control rings 314, as described further below. The plurality of openings 318 may further include an outlet opening 3182 configured to allow at least a portion of the flow of fluid 91, depicted schematically via flow of fluid 92, to egress the first cavity 1321 and enter an inner wall conduit 1326 such as described further below.

Referring to FIGS. 3-7, in particular embodiments, the manifold 316 includes an inner manifold wall 1316 surrounding the thermal control rings 314 along the circumferential direction C and the axial direction A. The manifold 316 may further include the outer manifold wall 2316 surrounding the inner manifold wall 1316, as discussed above. A passage wall 1318 is extended to the outer manifold wall 2316 and the inner manifold wall 1316 to form a passage 1320 within the passage wall 1318.

In certain embodiments, such as depicted in FIG. 2, the outer manifold wall 2316 of the manifold 316 is extended along the axial direction A at or aft the plurality of vanes 310. The outer manifold wall 2316 is further connected to the outer casing wall 312 at or aft of the plurality of vanes 310. In still certain embodiments, such as depicted in FIGS. 3-5, the inner manifold wall 1316 is extended to a location forward along the axial direction A of the plurality of vanes 310. The inner manifold wall 1316 is also extended to a location aft along the axial direction A of the plurality of walls forming the thermal control rings 314. As such, the inner manifold wall 1316 is connected to the outer casing wall 312 forward of the plurality of vanes 310 and aft of the thermal control rings 314.

The first cavity 1321 discussed above is formed between the inner manifold wall 1316 and the outer casing wall 312. The thermal control rings 314 are surrounded by the inner manifold wall 1316 at a location within the first cavity 1321 between the inner manifold wall 1316 and the outer casing wall 312. The passage 1320 allows for fluid communication with the first cavity 1321 between the inner manifold wall 1316 and the outer casing wall 312. The passage 1320 further allows for the flow of fluid 91 to enter into thermal communication with the thermal control rings 314.

In various embodiments, a conduit 1324 is formed between the outer manifold wall 2316 and the inner manifold wall 1316. The conduit 1324 is in fluid communication with the first cavity 1321 and is fluidly separated from passage 1320 by the passage wall 1318. In particular embodiments, the passage wall 1318 is extended from the outer manifold wall 2316 to the inner manifold wall 1316 through the conduit 1324.

Referring to FIGS. 3-5, and further in regard to FIG. 7, the conduit 1324 is extended in fluid communication through one or more of the plurality of vanes 310. FIG. 4 and FIG. 7 particularly depict the flow of fluid 91 entering into thermal communication and fluid communication with the thermal control rings 314 in the first cavity 1321. FIG. 4 particularly depicts the flow of fluid 91 entering into thermal communication and fluid communication with the thermal control rings 314 in the first cavity 1321. In various embodiments, the first cavity 1321 is formed to direct the flow of fluid to thermal contact portions of the thermal control rings directly, such as in a perpendicular direction. FIG. 5 and FIG. 7 particularly depict the flow of fluid 92 egressing from the first cavity 1321 through the conduit 1324 and then in serial flow through one or more of the vanes 310 (as airflow 99, discussed below). In certain embodiments, the thermal control rings 314 are formed with the outer casing wall 312 to desirably improve clearance control. In one embodiment, such as depicted in FIG. 6B, the thermal control ring 314 includes outer surfaces extended as a ridge, groove, or at acute or zig-zagging angles (see more detailed description below).

Referring briefly to FIG. 7, and further depicted in the detailed perspective view in FIG. 8, in certain embodiments, the inner manifold wall 1316 is a double wall structure forming an inner wall conduit 1326 between the double wall structure of the inner manifold wall 1316. The inner wall conduit 1326 may extend in fluid communication to a second cavity 1322 formed between the outer casing wall 312 and an outer wall 170 of the gas flowpath 70. In such embodiments, the unitary, integral casing 300, or furthermore integral to embodiments of the manifold 316, allow for separate flows into the plurality of vanes 310. Particularly, the flow of fluid 91 enters the conduit 1324 from a compressor section or other fluid source. A portion of the flow of fluid 91, depicted via arrows 92, flows into the first cavity 1321 and then into the inner wall conduit 1326 formed at the double wall structure. The flow of fluid 92 then flows into one or more of the plurality of vanes 310. Furthermore, another portion of the flow of fluid 91, depicted via arrows 99, remains in the conduit 1324 and flows into one or more of the plurality of vanes 310. In certain embodiments, the flows 92, 99 are isolated or fluidly separated from one another until mixing at the plurality of vanes 310. In other embodiments, the flows 92, 99 remain fluidly separated and are provided to separate respective vanes 310, or separate conduits within each vane 310. Embodiments of the casing 300 and manifold 316 allow for improved thermal efficiency and improved overall engine efficiency, such as via providing secondary uses of the flow of fluid after thermal communication with the thermal control rings 314, rather than outputting the flows to atmosphere or to an under-cowl area of the engine.

In certain embodiments, the outer wall 170 of the gas flowpath 70 forms the outer shroud segment 77 of the shroud assembly 72. The outer shroud segment 77 is exposed to the gas flowpath 70, and may include thermal barrier coatings or materials configured to withstand heat from the combustion gases. The outer shroud segment 77 may further be configured to at least partially rub with one or more stages of blades at the gas flowpath 70.

Referring now to FIG. 6, a partial circumferential view of an embodiment of the manifold 316 is provided. FIGS. 6A-6D furthermore provide sectional views of the embodiment depicted in FIG. 6. As previously described, various embodiments of the manifold 316 are formed via one or more additive manufacturing processes. Referring particularly to the close-up view of FIG. 6C, in various embodiments, a member 3316 extended to the inner manifold wall 1316 and the outer manifold wall 2316. The member 3316 is extended at an acute angle (e.g., a V-, Z-, or other angled cross-section) from the inner manifold wall 1316 to the outer manifold wall 2316. In various embodiments, the member 3316 is extended along a first direction, depicted schematically via arrows 95, and a second direction opposite of the first direction, depicted schematically via arrows 96.

Embodiments of the improved turbine casing 300 and engine 10 provided herein allow for improved clearance control, cooling fluid distribution, reduced weight, and improved engine efficiency. Embodiments of the engine 10, casing 300, and manifold 316 provided herein include integral, unitary structures, such as the casing extended over the stages of the high pressure turbine, or further including the inter-turbine frame, or further including all or part of the manifold, such as may be formed by additive manufacturing processes that would not have heretofore been possible or practicable. Embodiments depicted and described herein allow for improved and advantageous positioning of thermal control rings 314 for improved clearance control response, improved formation and positioning of openings, passages, and conduits to allow for more efficient heat transfer fluid utilization and movement, and reduced weight, such as via obviating flanges and sub-assemblies into integral components. Particular combinations of these features allow for improved heat transfer properties and reduced thermal gradients. Improved heat transfer properties particularly include lowering a heat transfer coefficient at certain features, such as the plurality of walls forms thermal control rings 314, in contrast to known clearance control systems. Such improvements may mitigate or eliminate undesired or excessive deformation, ovalization, bowing, or other changes in geometry of the casing 300 that may adversely affect deflections or result in undesired contact to the turbine rotor blades 58 at the high speed turbine 28.

Embodiments of the engine 10 and casing 300 provided herein include an integral, unitary casing for the high speed turbine 28 together with a turbine center frame or mid-turbine frame, formed by the outer casing wall 312 and vanes 310 and positioned downstream along the gas flowpath 70 of the high speed turbine 28 and upstream along the gas flowpath 70 of a low- or intermediate-pressure turbine, such as depicted at turbine 30. Embodiments provided herein further include e.g., an integral, unitary clearance control manifold configured to provide heat transfer fluid to thermal control rings. The integral, unitary structures may further allow for improved positioning of the thermal control rings relative to the turbine rotors, such as to provide improved clearance control across the turbine rotor assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A gas turbine engine, wherein the engine defines an axial direction co-directional to a centerline axis, a radial direction extended from the centerline axis, and a circumferential direction relative to the centerline axis, the engine comprising a first turbine rotor assembly comprising a plurality of first turbine rotor blades extended within a gas flowpath; a second turbine rotor assembly positioned aft along the gas flowpath of the first turbine rotor assembly, wherein the second turbine rotor assembly is rotatably separate from the first turbine rotor assembly; a casing surrounding the first turbine rotor assembly, wherein the casing comprises an outer casing wall extended forward of the first turbine rotor assembly and aft of the first turbine rotor assembly, and wherein the casing comprises a plurality of vanes extended from the outer casing wall and through the gas flowpath aft of the first turbine rotor assembly and forward of the second turbine rotor assembly, and further wherein the casing comprises a plurality of walls forming thermal control rings extended outward along the radial direction from the outer casing wall, and wherein the outer casing wall and the thermal control rings is a unitary, integral structure.

2. The gas turbine engine of any one or more clauses herein, wherein the plurality of walls comprises a plurality of axially-spaced stages, wherein the plurality of axially-spaced stages corresponds to an axial position of each respective first turbine rotor stage.

3. The gas turbine engine of any one or more clauses herein, the engine comprising a manifold surrounding the plurality of walls along the circumferential direction and the axial direction, wherein the manifold is configured to provide a flow of fluid to the plurality of walls, and wherein the manifold is a unitary, integral structure.

4. The gas turbine engine of any one or more clauses herein, wherein the manifold is extended along the axial direction forward and aft of the plurality of axially-spaced stages of the plurality of walls.

5. The gas turbine engine of any one or more clauses herein, wherein the manifold comprises a plurality of openings surrounding the plurality of walls at the casing, 6. The gas turbine engine of any one or more clauses herein, wherein the manifold comprises an inner manifold wall surrounding the plurality of walls at the casing along the circumferential direction and the axial direction, and an outer manifold wall surrounding the inner manifold wall, wherein a passage wall is extended to the outer manifold wall and the inner manifold wall to form a passage therewithin, and wherein the passage is in fluid communication with a first cavity between the inner manifold wall and the outer casing wall.

7. The gas turbine engine of any one or more clauses herein, wherein a conduit is formed between the outer manifold wall and the inner manifold wall, wherein the conduit is in fluid communication with the first cavity, and wherein the passage wall separates the conduit from the passage within the passage wall.

8. The gas turbine engine of any one or more clauses herein, wherein the conduit is extended in fluid communication to a second cavity formed between the outer casing wall and the shroud assembly.

9. The gas turbine engine of any one or more clauses herein, wherein the conduit is extended in fluid communication through one or more of the plurality of vanes.

10. The gas turbine engine of any one or more clauses herein, wherein the manifold, the outer casing wall, and the plurality of walls of the casing is a unitary, integral structure.

11. The gas turbine engine of any one or more clauses herein, wherein the outer manifold wall is extended aft along the axial direction of the plurality of vanes, and wherein the outer manifold wall is connected to the outer casing wall aft of the plurality of vanes.

12. The gas turbine engine of any one or more clauses herein, wherein the inner manifold wall is extended forward along the axial direction of the plurality of vanes, and wherein the inner manifold wall is connected to the outer casing wall forward of the plurality of vanes.

13. The gas turbine engine of any one or more clauses herein, wherein the inner manifold wall comprises a double wall structure forming an inner wall conduit.

14. The gas turbine engine of any one or more clauses herein, wherein the inner wall conduit is extended in fluid communication to a second cavity formed between the outer casing wall and an outer wall of the gas flowpath.

15. The gas turbine engine of any one or more clauses herein, wherein the manifold is extended along the axial direction forward and aft of the plurality of axially-spaced stages of the plurality of walls, and wherein the manifold is extended aft along the axial direction of the plurality of vanes.

16. The gas turbine engine of any one or more clauses herein, wherein the manifold comprises an inner manifold wall surrounding the plurality of walls at the casing along the circumferential direction and the axial direction; an outer manifold wall surrounding the inner manifold wall, wherein a passage wall is extended to the outer manifold wall and the inner manifold wall to form a passage therewithin, and wherein the passage is in fluid communication with a first cavity between the inner manifold wall and the outer casing wall; and a member extended to the inner manifold wall and the outer manifold wall, wherein the member is extended at an acute angle from the inner manifold wall to the outer manifold wall along a first direction and a second direction opposite of the first direction.

17. The gas turbine engine of any one or more clauses herein, wherein the casing forms a corrugated feature extended along the axial direction.

18. A gas turbine engine, wherein the engine defines an axial direction co-directional to a centerline axis, a radial direction extended from the centerline axis, and a circumferential direction relative to the centerline axis, the engine comprising a first turbine rotor assembly comprising a plurality of first turbine rotor blades extended within a gas flowpath; a second turbine rotor assembly positioned aft along the gas flowpath of the first turbine rotor assembly, wherein the second turbine rotor assembly is rotatably separate from the first turbine rotor assembly; a casing surrounding the first turbine rotor assembly, wherein the casing comprises a unitary, integral outer casing wall extended forward of the first turbine rotor assembly and aft of the first turbine rotor assembly, and wherein the casing comprises a plurality of vanes extended from the outer casing wall and through the gas flowpath aft of the first turbine rotor assembly and forward of the second turbine rotor assembly, and further wherein the casing comprises a plurality of walls extended outward along the radial direction from the outer casing wall, and wherein the outer casing wall and the plurality of walls is a unitary, integral structure; an inner manifold wall surrounding the plurality of walls at the casing along the circumferential direction and the axial direction, wherein the inner manifold wall is extended forward along the axial direction of the plurality of vanes, and wherein the inner manifold wall is connected to the outer casing wall forward of the plurality of vanes; and an outer manifold wall surrounding the inner manifold wall, wherein the outer manifold wall and the inner manifold wall together form a unitary, integral structure.

19. The gas turbine engine of any one or more clauses herein, wherein a passage wall is extended to the outer manifold wall and the inner manifold wall to form a passage therewithin, and wherein the passage is in fluid communication with a first cavity between the inner manifold wall and the outer casing wall.

20. The gas turbine engine of any one or more clauses herein, wherein the inner manifold wall forms a double wall structure, and wherein an inner wall conduit is formed within the double wall structure in fluid communication with a first cavity formed between the inner manifold wall and the outer casing wall.

What is claimed is:

1. A gas turbine engine, wherein the engine defines an axial direction co-directional to a centerline axis, a radial direction extended from the centerline axis, and a circumferential direction relative to the centerline axis, the engine comprising:
a first turbine rotor assembly comprising a plurality of first turbine rotor blades extended within a gas flowpath;
a second turbine rotor assembly positioned aft along the gas flowpath of the first turbine rotor assembly, wherein the second turbine rotor assembly is rotatably separate from the first turbine rotor assembly; and
a casing surrounding the first turbine rotor assembly, wherein the casing comprises an outer casing wall extended forward of the first turbine rotor assembly and aft of the first turbine rotor assembly, and wherein the casing comprises a plurality of vanes extended from the outer casing wall and through the gas flowpath aft of the first turbine rotor assembly and forward of the second turbine rotor assembly, and further wherein the casing comprises a plurality of walls forming thermal control rings extended outward along the radial direction from the outer casing wall, and wherein the outer casing wall and the thermal control rings are a unitary, integral structure.

2. The gas turbine engine of claim 1, wherein the first turbine rotor assembly further comprises a plurality of first turbine rotor stages, wherein the plurality of walls comprises a plurality of axially-spaced stages, wherein the plurality of axially-spaced stages corresponds to an axial position of each respective first turbine rotor stage.

3. The gas turbine engine of claim 2, the engine comprising:
a manifold surrounding the plurality of walls along the circumferential direction and the axial direction, wherein the manifold is configured to provide a flow of fluid to the plurality of walls, and wherein the manifold is a unitary, integral structure.

4. The gas turbine engine of claim 3, wherein the manifold is extended along the axial direction forward and aft of the plurality of axially-spaced stages of the plurality of walls.

5. The gas turbine engine of claim 4, wherein the manifold defines a plurality of openings surrounding the plurality of walls at the casing.

6. The gas turbine engine of claim 5, wherein the manifold comprises:
an inner manifold wall surrounding the plurality of walls at the casing along the circumferential direction and the axial direction, and
an outer manifold wall surrounding the inner manifold wall, wherein a passage wall is extended to the outer manifold wall and the inner manifold wall to form a passage with the passage wall, and wherein the passage is in fluid communication with a first cavity between the inner manifold wall and the outer casing wall.

7. The gas turbine engine of claim 6, wherein a conduit is formed between the outer manifold wall and the inner manifold wall, wherein the conduit is in fluid communication with the first cavity, and wherein the passage wall separates the conduit from the passage within the passage wall.

8. The gas turbine engine of claim 7, wherein the conduit is extended in fluid communication to a second cavity formed between the outer casing wall and a shroud assembly.

9. The gas turbine engine of claim 7, wherein the conduit is extended in fluid communication through one or more of the plurality of vanes.

10. The gas turbine engine of claim 7, wherein the manifold, the outer casing wall, and the plurality of walls of the casing is a unitary, integral structure.

11. The gas turbine engine of claim 6, wherein the outer manifold wall is extended aft along the axial direction of the plurality of vanes, and wherein the outer manifold wall is connected to the outer casing wall aft of the plurality of vanes.

12. The gas turbine engine of claim 11, wherein the inner manifold wall is extended forward along the axial direction of the plurality of vanes, and wherein the inner manifold wall is connected to the outer casing wall forward of the plurality of vanes.

13. The gas turbine engine of claim 6, wherein the inner manifold wall comprises a double wall structure forming an inner wall conduit.

14. The gas turbine engine of claim 13, wherein the inner wall conduit is extended in fluid communication to a second cavity formed between the outer casing wall and an outer wall of the gas flowpath.

15. The gas turbine engine of claim 3, wherein the manifold is extended along the axial direction forward and aft of the plurality of axially-spaced stages of the plurality of walls, and wherein the manifold is extended aft along the axial direction of the plurality of vanes.

16. The gas turbine engine of claim 3, wherein the manifold comprises:
an inner manifold wall surrounding the plurality of walls at the casing along the circumferential direction and the axial direction;
an outer manifold wall surrounding the inner manifold wall, wherein a passage wall is extended to the outer manifold wall and the inner manifold wall to form a passage within the passage wall, and wherein the passage is in fluid communication with a first cavity between the inner manifold wall and the outer casing wall; and
a member extended to the inner manifold wall and the outer manifold wall, wherein the member is extended at an acute angle from the inner manifold wall to the outer manifold wall along a first direction and a second direction opposite of the first direction.

17. The gas turbine engine of claim 1, wherein the casing forms a corrugated feature extended along the axial direction.

18. A gas turbine engine, wherein the engine defines an axial direction co-directional to a centerline axis, a radial direction extended from the centerline axis, and a circumferential direction relative to the centerline axis, the engine comprising:
a first turbine rotor assembly comprising a plurality of first turbine rotor blades extended within a gas flowpath;
a second turbine rotor assembly positioned aft along the gas flowpath of the first turbine rotor assembly, wherein the second turbine rotor assembly is rotatably separate from the first turbine rotor assembly;
a casing surrounding the first turbine rotor assembly, wherein the casing comprises a unitary, integral outer casing wall extended forward of the first turbine rotor assembly and aft of the first turbine rotor assembly, and wherein the casing comprises a plurality of vanes extended from the outer casing wall and through the gas flowpath aft of the first turbine rotor assembly and forward of the second turbine rotor assembly, and further wherein the casing comprises a plurality of walls extended outward along the radial direction from the outer casing wall, and wherein the outer casing wall and the plurality of walls is a unitary, integral structure;
an inner manifold wall surrounding the plurality of walls at the casing along the circumferential direction and the axial direction, wherein the inner manifold wall is extended forward along the axial direction of the plurality of vanes, and wherein the inner manifold wall is connected to the outer casing wall forward of the plurality of vanes; and
an outer manifold wall surrounding the inner manifold wall, wherein the outer manifold wall and the inner manifold wall together form a unitary, integral structure.

19. The gas turbine engine of claim 18, wherein a passage wall is extended to the outer manifold wall and the inner manifold wall to form a passage with the passage wall, and wherein the passage is in fluid communication with a first cavity between the inner manifold wall and the outer casing wall.

20. The gas turbine engine of claim 18, wherein the inner manifold wall forms a double wall structure, and wherein an inner wall conduit is formed within the double wall structure in fluid communication with a first cavity formed between the inner manifold wall and the outer casing wall.

* * * * *

UNITED STATES PATENT AND TRADEMARK OFFICE
CERTIFICATE OF CORRECTION

| | | |
|---|---|---|
| PATENT NO. | : 11,719,115 B2 | Page 1 of 1 |
| APPLICATION NO. | : 17/561182 | |
| DATED | : August 8, 2023 | |
| INVENTOR(S) | : Tomasz Edward Berdowski et al. | |

It is certified that error appears in the above-identified patent and that said Letters Patent is hereby corrected as shown below:

On the Title Page

Add foreign priority as follows:
(30) Foreign Application Priority Data
Nov. 5, 2021 (PL) . . . . . . . . . . . . . 439447

Signed and Sealed this
Thirtieth Day of January, 2024

Katherine Kelly Vidal
*Director of the United States Patent and Trademark Office*